Nov. 29, 1927.
R. J. WENSLEY
1,650,970
AUTOMATIC STATION
Filed Feb. 12, 1925
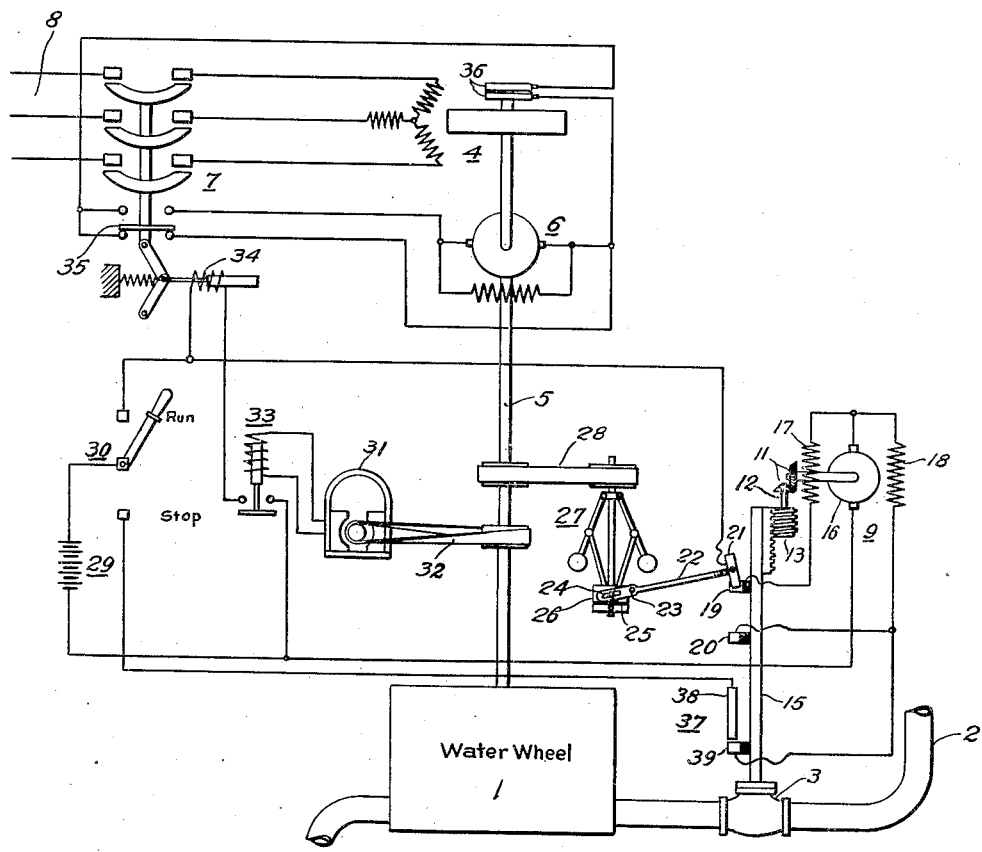
WITNESSES:
INVENTOR
Roy J. Wensley
BY
Wesley G. Carr
ATTORNEY Patented Nov. 29, 1927.

1,650,970

UNITED STATES PATENT OFFICE.

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed February 12, 1925. Serial No. 8,780.

My invention relates to automatic stations and more particularly to automatic generating stations.

One object of my invention is to provide means in a generating station for automatically starting the prime mover from rest in response to predetermined conditions and for bringing the prime mover up to a predetermined speed.

Another object of my invention is to provide means for governing the speed of the prime mover to maintain the same at substantially a constant predetermined value.

A further object of my invention is to provide a system, of the above-indicated character, that shall be very simple and inexpensive to construct and that shall be reliable in operation.

My invention comprises, in general, a prime mover, means for controlling the rate of supply of energy thereto and means for controlling the rate-controlling means in accordance with the speed of the prime mover. This is accomplished by providing means responsive to the speed of the prime mover and an electrical contact member that is actuated thereby. This contact member is adapted to engage a plurality of contact members that are actuated by the rate-controlling means. The several contact members co-operate to control the energization of a reversible electric motor that actuates the rate-controlling means. Thus, the rate of supply of energy to the prime mover is maintained at such value that the proper relation is obtained between the speed of the prime mover and the load thereon.

The single figure of the accompanying drawing is a diagrammatic representation of a system embodying my invention.

Referring to the drawing, a prime mover 1, that is illustrated as a water wheel, is supplied with energy from a source (not shown) through a pipe or conduit 2 and a gate valve 3. The water wheel 1 is illustrated as driving the rotating member of an alternating-current generator 4, by means of a shaft 5. The armature member of an exciter generator 6, that is adapted to supply energy to the field-magnet windings of the generator 4, is also driven by the shaft 5. The stator windings of the generator 4 are adapted to be connected through a circuit interrupter 7 to an alternating-current system 8 to supply energy thereto.

The rate of supply of energy to the water wheel 1 is governed by the opening of the gate valve 3, which is actuated by a reversible electric motor 9 through a shaft 10, bevel gears 11, shaft 12, worm 13, and a rack 14. The rack 14 is so secured to a rod 15 that is directly connected to the gate member of the valve 3 that any operation of the motor 9 causes a corresponding movement of the gate member of the valve 3.

The reversible motor 9 comprises an armature member 16 and two field-magnet windings 17 and 18, either one of which may be connected in series with the armature member 16 to effect operation of the motor in either direction. The field-magnet windings 17 and 18 are so wound with respect to the armature member 16 that, when current traverses the winding 17 and the armature member 16 in series, the motor 9 operates to open the valve 3, and, when current traverses the winding 18 and the armature member 16, the motor 9 operates to close the valve 3. One terminal of the winding 17 is connected to a contact member 19 that is mounted on the rod 15, but is insulated therefrom. One terminal of the winding 18 is similarly connected to a contact member 20 that is also mounted on the rod 15 and is insulated therefrom.

The contact members 19 and 20 are vertically displaced on the rod 15 by a distance that is very slightly in excess of the length of a third contact member 21. The contact member 21 is mounted, through an insulating member, on one end of a lever arm 22 that is pivotally supported by a stationary pin 23. The opposite end of the lever arm 22 is provided with a slot 24 that is engaged by a pin 25. The pin 25 is secured to the lower collar member 26 of a fly-ball governor 27 that is driven from the shaft 5 by a belt 28. Thus, since the lower collar member 26 of the governor 27 assumes a position on its vertical path of travel that is determined in accordance with the speed of the shaft 5, the position of the contact member 21 is determined in accordance with the speed of the wheel 1 and shaft 5, by reason of the fact that it is mechanically connected to the collar member 26 through the pin 25 and the lever arm 22, as described.

The contact member 21 is adapted to engage the contact members 19 and 20 selectively to control the operation of the motor 9. When the contact member 21 engages the contact member 19 during the operating period of the station, the field-magnet winding 17 and the armature member 16 of the motor 9 are energized, and when the contact member 21 engages the contact member 20, the field-magnet winding 18 and the armature member 16 are energized. The motor 9 is adapted to be actuated in either direction depending upon which of its field-magnet windings is energized, as has been previously described. The source of energy for the motor 9 comprises a battery 29 which also supplies energy for various other electrical controlling devices in the station.

When it is desired that operation of the station be started, a switch 30 is closed in its upper position, which is marked "Run" in the drawing. The switch 30 is illustrated as a manually-operated, single-pole, double-throw switch, but it will be readily understood that the switches of any desired type of relay or remotely-controlled device may be substituted therefor. When the rotating member of the water wheel 1, and hence the shaft 5, are at rest, the governor 27 is also at rest and its lower collar member 26 is in its lowest position. The contact member 21 at the opposite end of the lever arm 22 is therefore at its highest position. Since the valve 3 is still in its completely closed position, the rod 15 is in its lowest position and the contact members 19 and 20 are also at the lowest positions on their respective paths of travel. The length of the contact member 21 is so proportioned with respect to the amount of travel of the lever arm 22 and of the rod 15, upon which the contact members 19 and 20 are mounted, that under the conditions just described, the lower end of the contact member 21 is in engagement with the contact member 19, as illustrated in the drawing. Upon closure of the switch 30 in its upper position, therefore, a circuit is completed from the upper terminal of the battery 29, through the switch 30, the contact members 21 and 19, and the field-magnet winding 17 and the armature member 16 of the motor 9 to the lower terminal of the battery 29. The motor 9 is thus energized from the battery 29 in such manner as to cause it to operate in the direction which causes the gate valve 3 to be opened.

Water is now admitted from the source (not shown) through the pipe or conduit 2 and the valve 3, to the water wheel 1 to start the same in operation. As the motor 9 continues to open the valve 3, the rate of supply of water to the wheel is gradually increased and the speed of the wheel 1 likewise increases. As this speed increases, the speed of the governor 27 increases in direct proportion and the contact member 21 is actuated to a lower position on its path of travel. At the same time, contact members 19 and 20 are being actuated to higher positions because of the upward movement of the rod 15. When the speed of the wheel 1 and the opening of the valve 3 have been increased to nearly the normal no-load values, the contact member 21 will have moved down a sufficient distance and the contact member 19 will have moved up a sufficient distance to cause these contact members to disengage each other.

If either the speed of the wheel 1 or the opening of the valve 3 increases beyond this point, the contact member 21 will be actuated downwardly or the contact member 20 will be actuated upwardly to effect engagement between the contact members 21 and 20. If such engagement occurs, the motor 9 will be energized through its field-magnet winding 18 and its armature member 16 from the battery 29. The motor 9 will then be actuated in such direction as to decrease the opening of the valve 3 and thereby to decrease the speed of the wheel 1. It will thus be seen that the contact member 21 will "float" between the contact members 19 and 20, engaging the one or the other of these contact members to increase or to decrease the opening of the valve 3 in such manner as to maintain the speed of the wheel 1, as indicated by the governor 27, at a substantially constant predetermined value.

As the speed of the wheel 1 and the shaft 5 was increasing during the increase in the rate of supply of energy to the wheel 1, the speed of a magneto 31, which is directly connected to the shaft 5 by means of a belt 32, was increasing proportionately. The magneto 31 is of a well known type, the terminal voltage of which is substantially in direct proportion to the speed of the rotating member thereof. The terminals of the magneto 31 are connected directly to the operating coil of a relay 33 that is adapted to close its switch when its operating coil is energized to a predetermined degree.

Thus, when the speed of the wheel 1 reaches a predetermined value, namely, approximately its normal operating value, the speed of the magneto 31 is sufficient that it will energize the operating coil of the relay 33 to such degree that this relay will close its switch. When the switch of the relay 33 is closed, a circuit is completed from the upper terminal of the battery 29, through the switch 30, the actuating coil 34 of the circuit interrupter 7, and the switch of the relay 33 to the lower terminal of the battery 29. The actuating coil 34 of the circuit interrupter 7 is thereupon energized from the battery 29 to effect closure of the circuit interrupter 7, thereby connecting the stator windings of the alternating-current generator 4 to the laternating-current system 8.

The circuit interrupter 7 is provided with an auxiliary switch 35, which, during the time that the circuit interrupter 7 is in its open position, completes a short-circuit between the slip rings 36 of the alternating-current generator 4, to which the rotating field-magnet windings thereof are connected in the usual manner. When the circuit interrupter 7 is actuated to its closed position, however, the switch 35 interrupts the short-circuit between the slip rings 36 and completes a circuit connecting the exciter generator 6 between the slip rings 36 to provide excitation for the field-magnet windings of the generator 4.

It will be understood that the speed of the exciter generator 6 is now approximately normal, since the wheel 1 is rotating at approximately its normal speed, and, therefore, its voltage will be such as to effect normal excitation of the field-magnet windings of the generator 4. Thus, the stator windings of the generator 4 are connected to the alternating-current system 8 at substantially the same instant that excitation is supplied to the field-magnet windings of the generators 4, this being at a time when the speed of the generator 4 is very near its normal value. The generator 4 will, therefore, pull into synchronism with the system 8 as the excitation of its field-magnet windings builds up and will begin to supply energy to the alternating-current system.

The water wheel 1 will now continue to drive the generator 4 to supply energy to the system 8 as long as the switch 30 is maintained closed in its upper, or running, position. During this time, the speed of the wheel 1 and the generator 4 will be controlled by the governor 27, which controls the motor 9 through the contact members 19, 20 and 21, as already described, the motor 9 actuating the gate member of the valve 3 to maintain the opening thereof at the proper value to maintain the desired speed of the generator 4 under normal load conditions thereon.

When it is desired that operation of the wheel 1 and generator 4 be stopped, the switch 30 is thrown to its lower position, which is marked "Stop" in the drawing. This may be done either manually or under the influence of automatic or remotely-controlled devices, as previously mentioned. Opening of the switch 30 from its running position interrupts the energizing circuit for the actuating coil 34 of the circuit interrupter 7, whereupon this interrupter is actuated to its open position to disconnect the stator windings of the generator 4 from the alternating-current system and to disconnect the field-magnet windings of the generator 4 from the exciter generator 6. When the circuit interrupter 7 is opened, the auxiliary switch 35 thereof is closed in its lower position to complete a short-circuit between the slip rings 36 of the generator 4, thereby short-circuiting the field-magnet windings of the generator 4. A discharge path for the current induced in the field-magnet windings of the generator 4 is thus provided and the excitation is quickly reduced to zero, thereby also reducing the voltage generated in the stator windings of the generator 4 to zero.

When the switch 30 is closed in its lower, or stopping, position, the motor 9 is immediately energized through its field-magnet winding 18 and its armature member 16 to actuate the valve 3 to its closed position. The circuit for effecting this energization extends from the upper terminal of the battery 29, through the switch 30 in its lower position, a limit switch 37, and the field-magnet winding 18 and the armature member 16 of the motor 9, to the lower terminal of the battery 29. The limit switch 37 comprises a stationary contact member 38 and a movable contact member 39 that is mounted on the rod 15 and that is adapted to engage the contact member 38 whenever the valve 3 is open to any degree. Thus, when the switch 30 is closed in its lower position, the motor 9 is energized to close the valve 3 regardless of the degree of opening of the valve 3 at the time that the switch 30 is actuated. When the valve 3 has been completely closed by the motor 9, the contact member 39 has been actuated downwardly by the rod 15 a sufficient distance to disengage the stationary contact member 38, thereby interrupting the circuit of the motor 9. All the apparatus in the station is now in the same condition in which it was first described and is ready to respond to the closure of the switch 30 in its running position in the same manner as previously described.

The valve 3 is prevented from "creeping" open after it has been closed and the motor 9 de-energized, by reason of the fact that the worm 13 prevents movement of the rack 14 and the rod 15. The position of the valve 3, therefore, always remains unchanged unless the motor 9 is energized to actuate it to a different position.

It will thus be seen that I have provided relatively simple and inexpensive electro-mechanical means for controlling the speed of a prime mover and also for effecting automatic starting of the prime mover from rest in response to predetermined conditions.

It will be understood that the system embodying my invention is not limited to the specific details of construction and connections that have been shown in the drawings and described in the foregoing specification, as many changes and modifications may be made therein without departing from the spirit and scope of my invention, as set forth in the appended claims.

I claim as my invention:

1. The combination with a prime mover, a source of energy for driving the same, and means responsive to the speed of the prime mover, of electro-mechanical means for varying the rate of supply of energy to the prime mover, and a plurality of movable electrical contact members that are adapted to engage each other to control the electro-mechanical means, one of said contact members being actuated by the speed-responsive means, and certain others of said contact members being actuated by the electro-mechanical means.

2. The combination with a prime mover, a source of energy for driving the same, and means responsive to the speed of the prime mover, of means for varying the rate of supply of energy to the prime mover, an electric motor for controlling said rate-varying means, and a plurality of movable electrical contact members that are adapted to engage each other to control the energization of the electric motor, one of said contact members being actuated by the speed-responsive means, and certain others of said contact members being actuated by the rate-varying means.

3. The combination with a prime mover, a source of energy for driving the same, and means responsive to the speed of the prime mover, of means for varying the rate of supply of energy to the prime mover, a reversible electric motor for controlling said rate-varying means, and a plurality of movable electrical contact members that are adapted to engage each other to control the energization of the electric motor, one of said contact members being actuated by the speed-responsive means, and certain others of said contact members being actuated by the rate-varying means.

4. In an automatically controlled prime mover station, the combination with a prime mover, a source of energy for driving the same, means responsive to the speed of the prime mover, and means for controlling the rate of supply of energy to the prime mover, of means for controlling the starting of the prime mover from rest, accelerating it to a predetermined speed, and maintaining its speed at a substantially constant predetermined value, comprising electrical means for controlling the rate-controlling means, and a plurality of movable electrical contact members that are adapted to engage each other to control the electrical means, one of said contact members being actuated by the speed-responsive means, and certain others of said contact members being actuated by the rate-controlling means.

5. In an automatically controlled prime mover station, the combination with a prime mover, a source of energy for driving the same, means responsive to the speed of the prime mover, and means for controlling the rate of supply of energy to the prime mover, of means for starting the prime mover from rest, accelerating it to a predetermined speed, and maintaining its speed at a substantially constant predetermined value, comprising a reversible electric motor for controlling the rate-controlling means, and a plurality of movable electrical contact members that are adapted to engage each other to control the reversible motor, one of said contact members being actuated by the speed-responsive means, and certain others of said contact members being actuated by the rate-controlling means.

6. Means for governing the speed of a rotating device comprising means responsive to the speed of the device, electric means for controlling the rate of supply of energy to the device, and a plurality of movable electric contact members that are adapted to engage each other to control the electrical means, one of said contact members being actuated by the speed-responsive means, and certain others of said contact members being actuated by the energy-supply rate-controlling means.

7. Means for governing the speed of a rotating device comprising means responsive to the speed of the device, an electric motor for controlling the rate of supply of energy to the device, and a plurality of movable electric contact members that are adapted to engage each other to control the electric motor, one of said contact members being actuated by the speed-responsive means, and certain others of said contact members being actuated by the energy-supply rate-controlling means.

8. Means for governing the speed of a rotating device comprising means responsive to the speed of the device, a reversible electric motor for controlling the rate of supply of energy to the device, and a plurality of movable electric contact members that are adapted to engage each other to control the reversible motor, one of said contact members being actuated by the speed-responsive means, and certain others of said contact members being actuated by the energy-supply rate-controlling means.

In testimony whereof, I have hereunto subscribed my name this 5th day of February 1925.

ROY J. WENSLEY.